(12) United States Patent
Katar et al.

(10) Patent No.: US 9,537,641 B2
(45) Date of Patent: Jan. 3, 2017

(54) CHANNEL ADAPTATION TO COMPENSATE FOR INTERFERENCE FROM NEIGHBOR POWERLINE COMMUNICATION NETWORKS

(71) Applicant: QUALCOMM Incorporated, San Diego, CA (US)

(72) Inventors: Srinivas Katar, Gainesville, FL (US); Hassan Kaywan Afkhami, Ocala, FL (US); Hao Zhu, Ocala, FL (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 13/906,274

(22) Filed: May 30, 2013

(65) Prior Publication Data

US 2014/0355621 A1 Dec. 4, 2014

(51) Int. Cl.
*H04B 7/212* (2006.01)
*H04L 5/00* (2006.01)
*H04B 3/54* (2006.01)

(52) U.S. Cl.
CPC .............. *H04L 5/006* (2013.01); *H04B 3/544* (2013.01); *H04L 5/0085* (2013.01);
(Continued)

(58) Field of Classification Search
CPC ... H04B 3/54; H04B 3/542; H04B 2203/5408; H04B 7/2643; H04B 2203/5416; H04B 2203/5412; H04B 2203/542; H04B 2203/5466; H04B 3/10; H04L 12/413; H04L 12/403; H04L 5/0023; H04L 5/008; H04L 12/40136; H04L 12/4035; H04L 12/407; H04L 5/0048; H04L 12/401364; H04L 25/0236; H04L 25/0202
(Continued)

(56) References Cited

U.S. PATENT DOCUMENTS 7,298,691 B1 * 11/2007 Yonge et al. ............... 370/203
7,729,372 B2 6/2010 Yonge, III et al.
(Continued)

FOREIGN PATENT DOCUMENTS

WO 2014194112 12/2014

OTHER PUBLICATIONS

"PCT Application No. PCT/US2014/040051 International Search Report", Sep. 19, 2014, 10 pages.

*Primary Examiner* — Wei Zhao
*Assistant Examiner* — Lionel Preval
(74) *Attorney, Agent, or Firm* — DeLizio Law, PLLC

(57) ABSTRACT

A first powerline communication device, associated with a first powerline communication network, determines a plurality of time intervals in a beacon period of the first powerline communication network based, at least in part, on variations in levels of interference from a second powerline communication network which shares a powerline communication medium with the first powerline communication network. The first powerline communication device determines at least one channel adaptation parameter for each of the plurality of time intervals in the beacon period to compensate for effects of the variations in the levels of interference from the second powerline communication network. The first powerline communication device applies the at least one channel adaptation parameter corresponding to one or more of the plurality of time intervals in the beacon period when transmitting data via the powerline communication medium.

40 Claims, 6 Drawing Sheets

(52) U.S. Cl.
CPC ............ *H04B 2203/5425* (2013.01); *H04B 2203/5445* (2013.01); *H04B 2203/5495* (2013.01)

(58) Field of Classification Search
USPC ............ 370/443, 445, 458, 203; 340/12.32
See application file for complete search history.

(56) References Cited

U.S. PATENT DOCUMENTS

| | | | |
|---|---|---|---|
| 7,822,058 B2 | 10/2010 | Ayyagari et al. | |
| 2007/0025384 A1* | 2/2007 | Ayyagari et al. | 370/445 |
| 2007/0025386 A1 | 2/2007 | Riedel et al. | |
| 2007/0025391 A1* | 2/2007 | Yonge et al. | 370/458 |
| 2008/0279126 A1 | 11/2008 | Katar et al. | |
| 2009/0154487 A1 | 6/2009 | Ryan et al. | |
| 2009/0174532 A1* | 7/2009 | Galli | H04B 3/544 340/12.32 |
| 2010/0111099 A1* | 5/2010 | Yonge, III | H04B 3/54 370/458 |

* cited by examiner

CHANNEL ADAPTATION TO COMPENSATE FOR INTERFERENCE FROM NEIGHBOR POWERLINE COMMUNICATION NETWORKS

BACKGROUND

Embodiments of the inventive subject matter generally relate to the field of communication networks, and, more particularly, to channel adaptation to compensate for interference from a neighbor powerline communication network on a shared powerline communication medium.

In a powerline communication (PLC) system, two or more PLC networks may utilize a shared PLC medium. For example, in a SoHo (small office/home office) environment, powerline wiring inside a dwelling unit may be shared by two or more PLC networks for providing connectivity between various devices. Multiple PLC networks may share the PLC medium using time division multiple access (TDMA), carrier sense multiple access (CSMA), etc. Such sharing of the PLC medium by multiple PLC networks can reduce the performance of PLC due to interference from neighbor PLC networks. For example, a transmission in a first PLC network may appear as interference to network devices in a second PLC network.

SUMMARY

Various embodiments are disclosed for implementing channel adaptation to compensate for neighbor network interference in powerline communication networks. In one embodiment, at a powerline communication device associated with a first powerline communication network, a plurality of time intervals in a beacon period of the first powerline communication network are determined based, at least in part, on variations in levels of interference from a second powerline communication network which shares a powerline communication medium with the first powerline communication network. At least one channel adaptation parameter is determined for each of the plurality of time intervals in the beacon period to compensate for effects of the variations in the levels of interference from the second powerline communication network. The at least one channel adaptation parameter corresponding to one or more of the plurality of time intervals in the beacon period is applied when transmitting data via the powerline communication medium.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
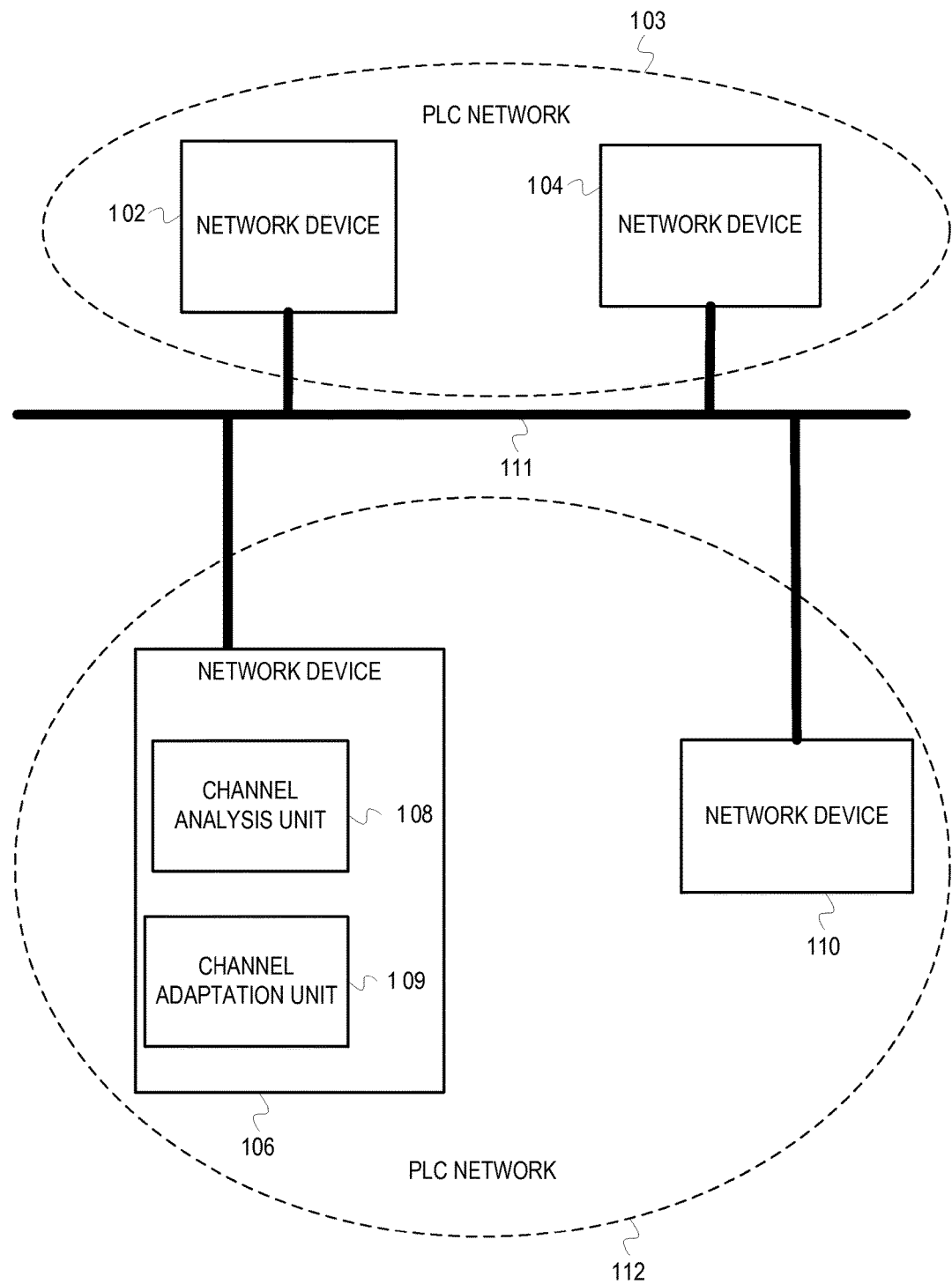
FIG. 1 depicts an example conceptual diagram of PLC networks sharing a PLC medium.

The description that follows includes exemplary systems, methods, techniques, instruction sequences and computer program products that embody techniques of the present inventive subject matter. However, it is understood that the described embodiments may be practiced without these specific details. For instance, although examples refer to performing channel adaptation in a first PLC network to compensate for interference from a neighbor PLC network sharing a PLC medium, embodiments are not so limited. In other embodiments, channel adaptation may be performed to compensate for interference from multiple neighbor PLC networks which share the PLC medium. In other instances, well-known instruction instances, protocols, structures and techniques have not been shown in detail in order not to obfuscate the description.

Noise and channel characteristics of the PLC medium can vary as a function of the alternating current (AC) line cycle of the PLC medium. Channel adaptation techniques can utilize the noise and channel characteristics of the PLC to synchronize channel adaptation with the AC line cycle. In some techniques, time intervals in a beacon period of a powerline communication network may be determined based on varying levels of channel noise. Channel adaptation can then be performed separately for each of the time intervals in the beacon period. Since the beacon period of the powerline communication network is related to the AC line cycle, channel adaptation can also be implemented in synchronization with the AC line cycle.

Various embodiments are disclosed for performing channel adaptation to compensate for interference from a neighbor PLC network. Channel adaptation can be performed in a PLC network to compensate for interference from the neighbor PLC network by synchronizing the channel adaptation with the beacon period of the PLC network, and in turn with the AC line cycle. Interference from the neighbor PLC network is typically periodic in nature (e.g., periodic with the beacon period of the neighbor PLC network), and the periodicity of interference can be utilized to perform the channel adaptation in the PLC network. For example, transmissions on a powerline medium in the neighbor PLC network may be scheduled in accordance with a TDMA scheme, and PLC devices in the neighbor PLC network may be scheduled to transmit for certain time intervals of the beacon period of the neighbor PLC network. Based on the allocation of the powerline medium for certain time intervals of the beacon period to the PLC devices of the neighbor PLC network (and also a time offset associated with the beacon period of the neighbor PLC network), periodic interference from the PLC devices in the neighbor PLC network can be determined. On determining the periodic interference from the PLC devices in the neighbor PLC network, one or more channel adaptation techniques can be utilized to perform channel adaptation at a transmitter of a network device in the PLC network, as will be further described below.

In some embodiments, a network device in a PLC network can determine time intervals in the beacon period of the PLC network to separately perform channel adaptation for each of the time intervals. For example, the network device can determine the time intervals based on the periodic interference from PLC devices in a neighbor PLC network. In other words, based on the interference measured from the PLC devices in the neighbor PLC network, the network device can determine boundaries of the time intervals in the beacon period. In one implementation, the network device can determine the time intervals such that the difference in interference between the time intervals is above a predefined threshold. The network device can then determine channel adaptation parameters for each of the time intervals separately to perform channel adaptation. It is noted that other techniques may also be utilized to determine the time intervals in the beacon period of the PLC network, as will be further described below.

FIG. 1 depicts an example conceptual diagram of PLC networks sharing a PLC medium. FIG. 1 includes a PLC network 103, a PLC network 112, and a PLC medium 111. The PLC networks 103 and 112 may be PLC networks based on standards such as HomePlug®, HomePlug AV, etc. The PLC medium 111 may be an electrical power line (e.g., a two-wire electrical line or a three-wire electrical line) and may support one or more PLC channels (e.g., Line/Neutral, Line/Ground, and Neutral/Ground). The PLC network 103 and the PLC network 112 can share the PLC medium 111. The PLC network 103 includes a network device 102 and a network device 104. The PLC network 112 includes a network device 110 and a network device 106. The network device 106 includes a channel analysis unit 108 and a channel adaptation unit 109. The network devices 102, 104, 110, and 106 may be various types of PLC devices, such as dedicated PLC devices (e.g., a PLC modem, a PLC adaptor, etc.) and electrical/electronic devices (e.g., television, computer, smart appliance, etc.) having PLC capabilities. The channel analysis unit 108 and the channel adaptation unit 109 can determine interference from the network devices 102 and 104 of the PLC network 103, and implement one or more channel adaptation techniques to compensate for the interference from the network devices 102 and 104. For simplification, FIG. 1 only depicts the channel analysis unit 108 and the channel adaptation unit 109 for the network device 106. However, it is noted that the network device 110 may include similar units to compensate for the interference from the network devices 102 and 104 in the PLC network 103 (hereinafter "neighbor PLC network 103"). Similarly, the network device 102 and the network device 104 may include a channel analysis unit and a channel adaptation unit to compensate for interference from the network devices 106 and 110 in the PLC network 112.

The channel analysis unit 108 may analyze the noise and other channel characteristics of the PLC medium 111 and the interference from the neighbor PLC network 103 on the PLC medium 111. The channel analysis unit 108 can implement one or more channel estimation techniques to determine the noise and other channel characteristics of the PLC medium 111. For example, the channel analysis unit 108 can measure the instantaneous channel state information (i.e., the impulse response) of the PLC medium 111. The channel analysis unit 108 can measure the noise on the PLC medium 111 as a function of AC line cycle and determine the periodicity of noise, as will be further described below with reference to FIGS. 2-5. For example, the channel analysis unit 108 can determine the time periods for which similar noise patterns occur on the PLC medium 111. The channel analysis unit 108 can also measure the interference from the neighbor PLC network 103 on the PLC medium 111 and determine the periodicity of interference from the neighbor PLC network 103. For example, the channel analysis unit 108 can measure the interference on the PLC medium 111 due to transmissions from the network device 102 and the network device 104 of the neighbor PLC network 103. In some implementations, the channel analysis unit 108 can determine the periodicity of the interference from the neighbor PLC network 103 based on recurring transmission patterns on the PLC medium 111. In other implementations, the channel analysis unit 108 can determine the periodicity of interference from the neighbor PLC network 103 by receiving channel allocation information of the neighbor PLC network 103 from one or more network devices in the neighbor PLC network 103, as will be further described below with reference to FIGS. 2-5. For example, the channel analysis unit 108 can receive the channel allocation information from a central coordinator in the neighbor PLC network 103. The channel analysis unit 108 can determine the channel access scheme (e.g., TDMA) in the neighbor PLC network 103 from the channel allocation information. For example, in PLC systems based on HomePlug AV, the central coordinator transmits beacon frames that may include the channel allocation information that can be used by the channel analysis unit 108. The channel analysis unit 108 may also proactively send requests to stations and/or central coordinators in the neighboring networks to obtain the channel allocation information of the neighboring networks. The channel analysis unit 108 can also utilize the channel allocation information to determine scheduled transmissions for the network devices 102 and 104 on the PLC medium 111. Based on the scheduled transmissions for the network devices 102 and 104, the channel analysis can determine the periodicity of interference due to transmissions from the network devices 102 and 104 on the PLC medium 111. The channel analysis unit 108 can map the periodic interference (with respect to a period of the AC line cycle) on the PLC medium 111 as periodic interference in the beacon period of the PLC network 112. The channel analysis unit 108 can then determine time intervals in the beacon period of the PLC network 112 such that the difference in interference between the time intervals is above a predefined threshold. The channel analysis unit 108 can send the information about the time intervals to the channel adaptation unit 109.

The channel adaptation unit 109 may separately perform channel adaptation in the time intervals received from the channel analysis unit 108. The channel adaptation unit 109 can perform channel adaptation for each of the time intervals by modifying one or more transmission parameters. For example, the channel adaptation unit 109 can modify the modulation parameters (e.g., bits allocated to an orthogonal frequency division multiplexing (OFDM) carrier, guard interval for an OFDM symbol, etc.). The channel adaptation unit 109 can also modify the FEC code rate (i.e., the number of redundant bits utilized for Forward Error Correction) at the transmitter of the network device 106. The channel adaptation unit 109 can distinctly perform channel adaptation for each of the time intervals determined by the channel analysis unit 108. In some implementations, instead of receiving information regarding the time intervals from the channel analysis unit 108, the channel adaptation unit 109 may receive both the channel allocation information associated with the neighbor PLC network 103 (and/or other information regarding the periodicity of the interference from the neighbor PLC network 103) and the measured noise on the PLC medium 111 from the channel analysis unit 108. The channel adaptation unit 109 can then determine the time intervals to separately perform the channel adaptation based on the information received from the channel analysis unit 108. By separately performing the channel adaptation at the transmitter of the network device 106 in regions of varying interference from the neighbor PLC network 103, the channel adaptation unit 109 can compensate for the interference from the neighbor PLC network 103 in the transmissions originating from the network device 106, as will be further described below.

Figure 2:
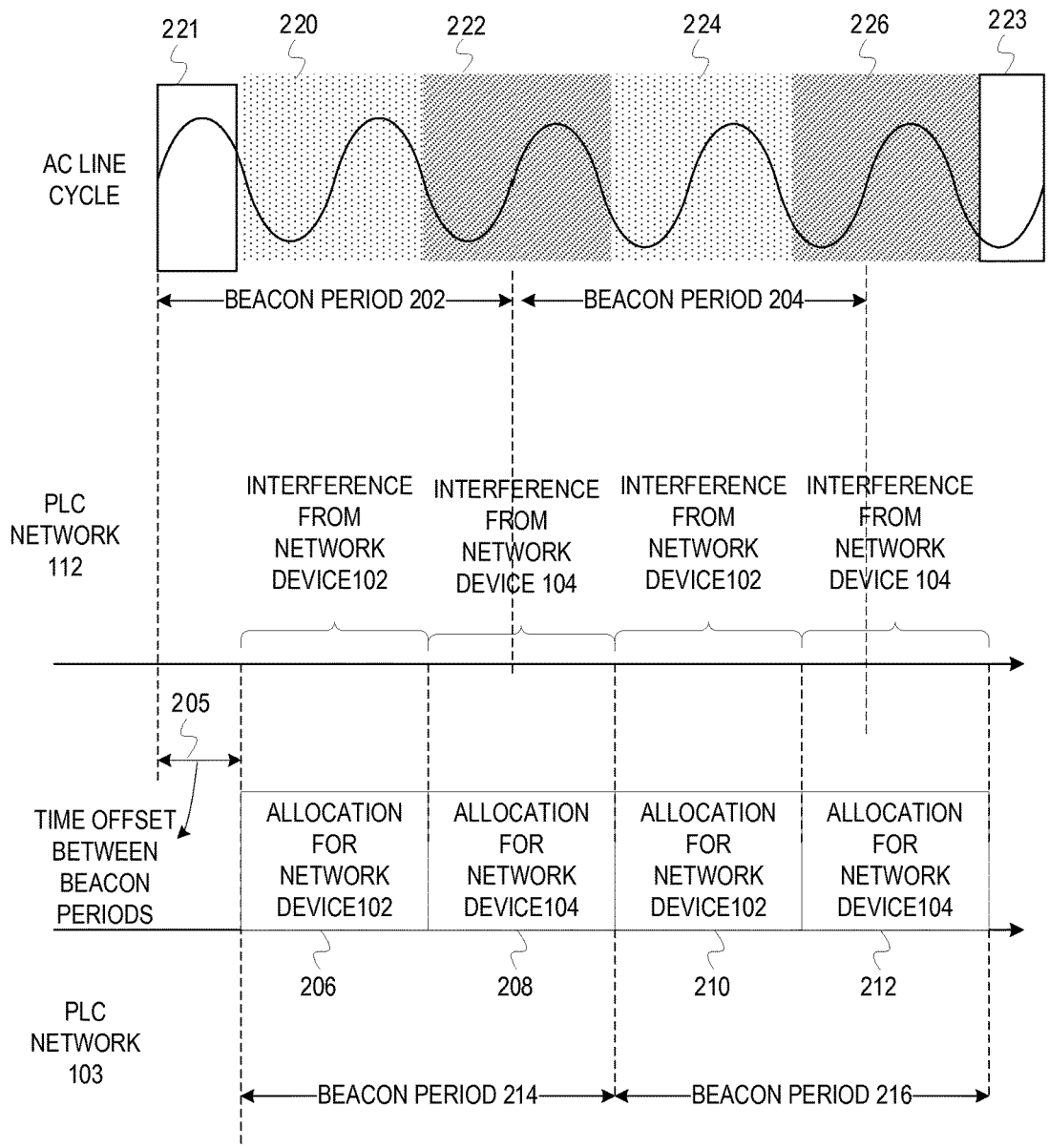
FIG. 2 depicts an example diagram of interference in a first PLC network from network devices in a second PLC network which shares a PLC medium with the first PLC network.

FIG. 2 depicts an example diagram of interference in a first PLC network from network devices in a second PLC network which shares a PLC medium with the first PLC network. FIG. 2 includes a beacon period 202 and a beacon period 204 of the PLC network 112 (as described above with reference to FIG. 1). FIG. 2 also includes a beacon period 214 and a beacon period 216 of the neighbor PLC network 103, and the AC line cycle for the PLC medium 111. The beacon period 214 of the neighbor PLC network 103 may be offset by a time interval 205 from the beacon period 202 of the PLC network 112. Similarly, the beacon period 216 may be offset by the time interval 205 from the beacon period 204.

The beacon period 214 includes a timeslot allocation 206 for transmissions by the network device 102 on the PLC medium 111, and a timeslot allocation 208 for transmissions by the network device 104 on the PLC medium 111. Similarly, the beacon period 216 includes a timeslot allocation 210 for the network device 102 and a timeslot allocation 212 for the network device 104. In some implementations, the timeslot allocations for the network devices 102 and 104 may be determined based on a TDMA channel access scheme associated with the neighbor PLC network 103. For example, the beacon period 214 may be divided into timeslots of equal duration, and each of the network devices in the neighbor PLC network 103 may be allocated a timeslot for transmissions on the PLC medium 111. In some implementations, a network device in the PLC network may be allocated more than one timeslot. However, for the purpose of simplification, FIG. 2 depicts an allocation of equal number of timeslots to the network device 102 and the network device 104 in the neighbor PLC network 103. Transmissions by the network device 102 on the shared PLC medium 111 in the timeslot 206 and the timeslot 210 may lead to interference in the PLC network 112 during a time interval 220 and a time interval 224 of the AC line cycle, respectively. Similarly, transmissions by the network device 104 in the timeslot 208 and the timeslot 212 can lead to interference in the PLC network 112 during the time intervals 222 and 226 of the AC line cycle. FIG. 2 also includes time intervals 221 and 223 in which no interference is depicted from transmissions by network devices in the neighbor PLC network 103. It is noted that for simplification, FIG. 2 does not depict channel noise of the PLC medium 111 in the AC line cycle. However, it is noted that channel noise may exist in the time intervals 221 and 223 as well as the time intervals 220, 222, 224, and 226 of the AC line cycle, as will be further described below with reference to FIG. 3.

In some implementations, the channel analysis unit 108 in the network device 106 can determine the time intervals 220, 221, 222, 223, 224, and 226 of the AC line cycle. For example, the channel analysis unit 108 can determine the time intervals based on detected transmissions from the neighbor PLC network 103 on the PLC medium 111. In this example, the channel analysis unit 108 can detect transmissions on the PLC medium 111 that are transmitted from one or more network devices in the neighbor PLC network 103. The channel analysis unit 108 can then determine the time intervals of the AC line cycle in which a difference in interference due to transmissions from the network devices in the neighbor PLC network 103 is above a predefined threshold. For example, the channel analysis unit 108 can determine a first time interval (e.g., time interval 220) should be considered a distinct time interval from a second time interval (e.g., time interval 222) after determining that the difference between the interference due to transmissions in the first time interval is greater than the interference due to the transmissions in the second time interval. After this analysis, the channel analysis unit 108 can determine that the time intervals 221, 220, 222, 224, 226, and 223 have a difference in interference due to transmissions (or lack of transmissions) from the network devices in the neighbor PLC network 103 that is above a predefined threshold. As shown in FIG. 2, each time interval has a first boundary and a second boundary that separates or divides the time interval from other time intervals. For example, the time interval 220 has a first boundary that divides the time interval 220 from the time interval 221, and also a second boundary that divides the time interval 220 from the time interval 222.

In another example, the channel analysis unit 108 may determine the time intervals of the AC line cycle based on channel allocation information exchanged with at least one network device in the neighbor PLC network 103. The channel analysis unit 108 can also receive information about the beacon period 206 of the network 103 and determine a time offset 205 between the beacon period 202 of the PLC network 112 and the beacon period 206 of the neighbor PLC network 103. The beacon periods of the PLC networks 103 and 112 may be of the same duration, and the time offset between the beacon periods 205 can be constant for each of the consecutive beacon periods (e.g., the beacon period 204 and the beacon period 216). The channel analysis unit 108 can receive information about the channel access scheme (e.g., TDMA scheme) utilized for allocating access to the PLC medium 111 in the neighbor PLC network 103. The channel analysis unit 108 can also receive the time slots allocated to each of the network devices in the neighbor PLC network 103 from a central coordinator of the neighbor PLC network 103. The channel analysis unit 108 can then determine time intervals of varying levels of interference from the neighbor PLC network 103 in the AC line cycle. For example, the varying levels of interference may occur as a result of transmissions by different devices in the neighbor PLC network 103. The channel analysis unit 108 can determine the time intervals 220 and 224 as intervals of varying levels of interference due to transmission by the network device 102 and the network device 104, respectively.

In some implementations, the channel analysis unit 108 can determine that the TDMA allocations in the neighbor PLC network 103 are periodic, and hence the varying levels of interference in the AC line cycle may also be periodic. The channel analysis unit 108 can utilize the periodic nature of the interference to determine the time intervals in the beacon period of the PLC network 112 for which channel adaptation may be separately performed. In other implementations, the channel analysis unit 108 can determine the time intervals in the beacon period of the PLC network 112 by using multiple techniques. For example, the channel analysis unit 108 can determine the time intervals based on transmissions from the neighbor PLC network 103 detected on the PLC medium 111 and also by utilizing the channel allocation information exchanged with at least one network device in the neighbor PLC network 103. The channel analysis unit 108 may receive the channel allocation information from a network device in the PLC network 103 and determine the transmission schedule of network devices in the PLC network 103. The channel analysis unit 108 may then detect for variations in levels of interference based on the transmission schedule of the network devices of the neighbor PLC network 103 and determine the time intervals in the beacon period of the PLC network 112. On determining the time intervals, the channel analysis unit 108 can send the information about the time intervals to the channel adaptation unit 109. Also, as described above in FIG. 1, the channel adaptation unit 109 may receive the channel allocation information of the neighbor PLC network 103 from the channel analysis unit 108 to determine the time intervals in the beacon period of the PLC network 112 instead of receiving the time intervals from the channel analysis unit 108. The channel adaptation unit 109 may utilize the channel allocation information in a similar manner as utilized by the channel analysis unit 108 to determine the time intervals in the beacon period of the PLC network 112.

Figure 3:
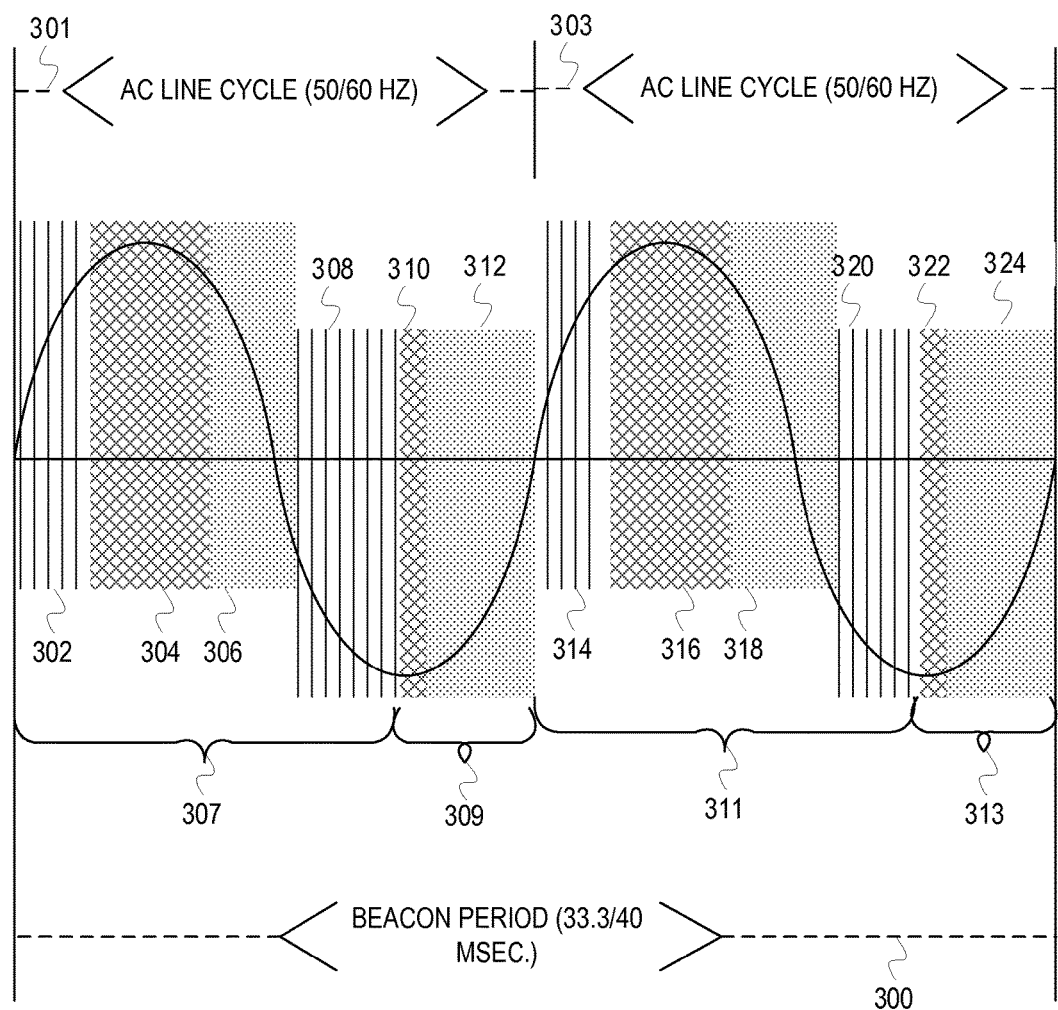
FIG. 3 depicts an example conceptual diagram of time intervals in a beacon period of a PLC network for which channel adaptation can be separately performed to compensate for channel noise and interference from a neighbor PLC network.

FIG. 3 depicts an example conceptual diagram of time intervals in a beacon period of a PLC network for which channel adaptation can be separately performed to compensate for channel noise and interference from a neighbor PLC network. FIG. 3 illustrates a beacon period 300 which is similar to the beacon periods 202 and 204 (as described above with reference to FIG. 2) of the PLC network 112. FIG. 3 also includes two periods of the AC line cycle of the PLC medium 111, which are referred to as AC line cycle 301 and AC line cycle 303. The duration of the beacon period 300 may be equal to the sum of durations of the AC line cycle 301 and the AC line cycle 303. The duration of beacon period of the PLC network 112 may be 33.3 milliseconds when the AC frequency on the PLC medium 111 is 60 Hertz. Similarly, the duration of the beacon period of the PLC network 112 may be 40 milliseconds when the AC frequency on the PLC medium 111 is 50 Hertz. The AC line cycle 301 includes time intervals 302, 304, 306, 308, 310, and 312. Similarly, the AC line cycle 303 includes time intervals 314, 316, 318, 320, 322, and 324. It is noted that the time intervals 314, 316, 318, 320, 322, and 324 are similar to the time intervals 302, 304, 306, 308, 310, and 312 respectively. For example, the channel analysis unit 108 may determine that time intervals 302, 304, 306, 308, 310, and 312 are periodic and repeat in each period of the AC line cycle. In one example, the time interval 312 depicts periodic interference and the interference in the time interval 324 can be similar to the interference in the time interval 312. Although, FIG. 3 illustrates the beginning of the time interval 302 synchronized with the beginning of the AC line cycle 301, and the end of the time interval 312 synchronized with the end of the AC line cycle 301, these may be approximately synchronized with some variance. It is noted, however, that in other examples, the end of the time interval 312 may not be synchronized with the end of the AC line cycle 301, and instead the time interval 312 may lie between the AC line cycle 301 and the AC line cycle 303 (and similarly the time interval 302 may lie between two AC line cycles).

In some implementations, the channel analysis unit 108 can determine the time intervals in the beacon period 300 for performing channel adaptation to compensate for channel noise and interference from the neighbor PLC network 103. For example, the channel analysis unit 108 can determine channel noise on the PLC medium 111 in the beacon period 300. The channel analysis unit 108 can then determine the time intervals over which the channel noise on the PLC medium 111 is periodic. For example, the channel analysis unit 108 can determine that the difference between the channel noise during a time interval 307 and the channel noise during a time interval 309 of the AC line cycle 301 is above a predefined threshold. The channel analysis unit 108 can determine that channel adaptation needs to be performed separately for the time interval 307 and the time interval 309. The channel analysis unit 108 can also determine that the channel noise patterns on the PLC medium 111 are repetitive, and time intervals 311 and 313 exist for the AC line cycle 303 which are similar to the time intervals 307 and 309 in the AC line cycle 301, respectively. On determining the time intervals in the beacon period 300 for which the difference in the channel noise on the PLC medium is above a predefined threshold, the channel analysis unit 108 can determine the time intervals in the beacon period 300 for which the difference in interference from the neighbor PLC network 103 is above a predefined threshold.

In one implementation, the channel analysis unit 108 can monitor the PLC medium 111 to detect transmissions from the network devices in the neighbor PLC network 103. The channel analysis unit 108 may detect transmissions from the network device 104 during the time intervals 304, 310, 316, and 322. Similarly, the channel analysis unit 108 may detect transmissions from the network device 102 during the time intervals 306, 312, 318, and 324. The channel analysis unit 108 may not detect transmissions from any network device of the neighbor PLC network 103 during the time intervals 302, 308, 314, and 320. The channel analysis unit 108 may determine that the difference in the interference during the time intervals 302 and 304 is above a predefined threshold. Similarly, the channel analysis unit 108 may determine that the difference in the interference during time intervals 304 and 306, and the difference in interference during the time intervals 306 and 308 are each above the predefined threshold. The channel analysis unit 108 can then determine the time intervals 302, 304, 306, 308, 310 and 312 in the AC line cycle 301. The channel analysis unit 108 can further determine that the interference patterns due to transmissions from the network devices in the neighbor PLC network 103 are repetitive over the AC line cycle 303. The channel analysis unit 108 can determine the time intervals 314, 316, 318, 320, 322, and 324 in the AC line cycle 303 for which channel adaptation may be separately performed by the channel adaptation unit 109. Although, as described above, the channel analysis unit 108 can determine the time intervals of the beacon period 300 based on the channel noise on the PLC medium 111, and then determine the time intervals based on interference from the neighbor PLC network 103, embodiments are not so limited. In some embodiments, the channel analysis unit 108 can first determine the time intervals of the beacon period 300 based on interference from the neighbor PLC network 103, and then determine the time intervals based on the channel noise on the PLC medium. In other embodiments, the channel analysis unit 108 can analyze the channel noise on the PLC medium 111 and the interference from the neighbor PLC network 103 simultaneously to determine the time intervals of the beacon period 300.

In another implementation, instead of detecting transmissions from the network devices of the neighbor PLC network 103, the channel analysis unit 108 may receive channel allocation information from one or more network devices of the neighbor PLC network 103 (as was previously described above). For example, the channel analysis unit 108 may receive the channel allocation information from a central coordinator of the neighbor PLC network 103. The channel allocation information may include the channel access scheme (e.g., TDMA, CSMA, etc.) utilized in the neighbor PLC network 103. The channel allocation information may also include a transmission schedule for the network devices in the neighbor PLC network 103. For example, the transmission schedule may include the time slots of a beacon period for which the network devices of the neighbor PLC network 103 are allowed to transmit on the PLC medium 111. The channel analysis unit 108 can then utilize the channel allocation information received from the central coordinator of the neighbor PLC network 103 along with information about the periodic channel noise on the PLC medium to determine the time intervals 302, 304, 306, 308, 310, 312, 314, 316, 318, 320, 322, and 324 in the beacon period 300.

It is further noted that, in other implementations, the channel analysis unit 108 may determine time intervals of the beacon period 300 without detecting transmissions from the network devices of the neighbor PLC network 103 or receiving channel allocation information from the central coordinator of the neighbor PLC network 103. The channel analysis unit 108 may determine a shortest time interval for which channel adaptation can be performed separately. For example, the channel analysis unit 108 may exchange information with the channel adaptation unit 109 to determine the capabilities of the channel adaptation unit 109. The channel analysis unit 108 may determine the shortest time period for which the channel adaptation unit 109 is capable of performing channel adaptation. The channel analysis unit 108 can then determine the time intervals of the beacon period 300 by partitioning the beacon period into time intervals equal to the shortest time period for which the channel adaptation unit 109 is capable of performing channel adaptation. In some implementations, the channel adaptation unit 109 may receive instructions from the channel analysis unit 108 indicating the period of a shortest time interval of the beacon period 300 to perform channel adaptation. The channel adaptation unit 109 can then determine the shortest time intervals of the beacon period 300 for which the channel adaptation unit 109 is capable of performing channel adaptation.

Figure 4:
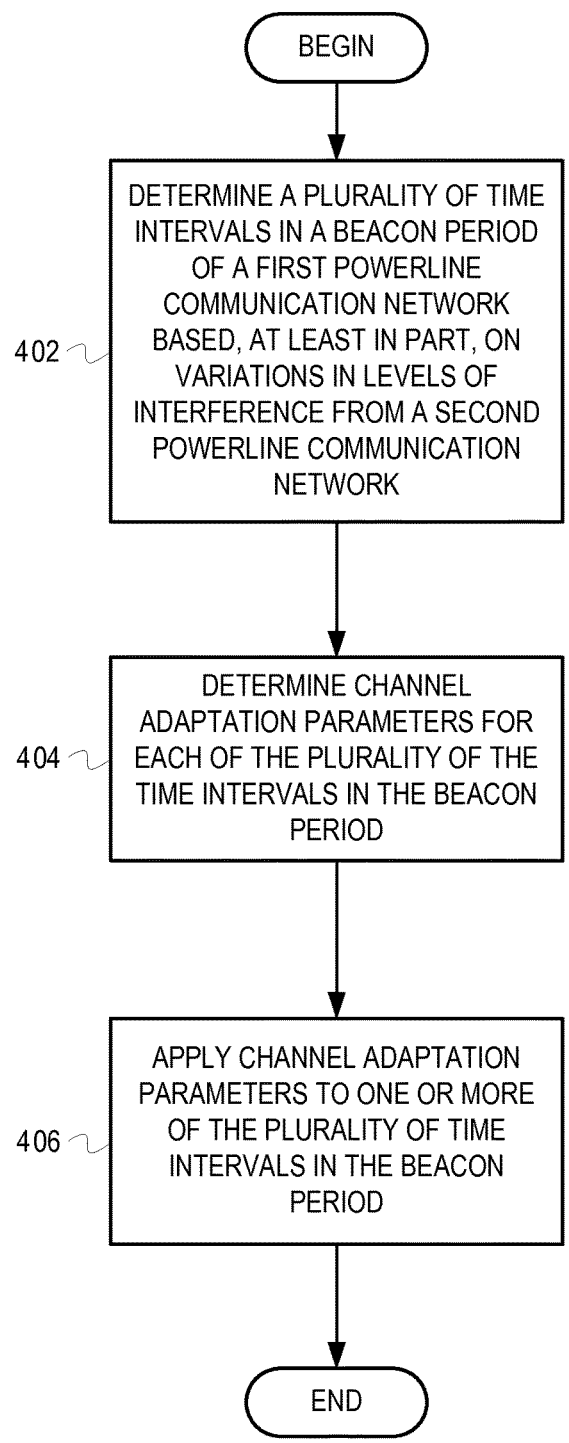
FIG. 4 illustrates a flow diagram of example operations to determine time intervals in a beacon period based on varying levels of interference from a neighbor PLC network and perform channel adaptation to compensate for the varying levels of interference.

FIG. 4 illustrates a flow diagram of example operations to determine time intervals in a beacon period based on varying levels of interference from a neighbor PLC network and perform channel adaptation to compensate for the varying levels of interference.

At block 402, a plurality of time intervals in a beacon period of a first PLC network are determined based, at least in part, on variations in levels of interference from a second PLC network. In one implementation, the channel analysis unit 108 determines the time intervals in the beacon period 300 of the neighbor PLC network 103. For example, the channel analysis unit 108 can determine the time intervals 302, 304, 306, 308, 312, 314, 316, 318, 320, 322, and 324 based on the varying levels of interference from the neighbor PLC network 103 (as described above with reference to FIG. 3). In some implementations, the channel analysis unit 108 may also utilize information about channel noise (and other channel characteristics) on the PLC medium 111 to determine the time intervals in the beacon period 300. In one implementation, the channel analysis unit 108 may detect the interference on the PLC medium 111 due to transmissions by the network devices in the neighbor PLC network 103. In another implementation, the channel analysis unit 108 may receive channel allocation information of the neighbor PLC network 103 from a central coordinator of the neighbor PLC network 103 to determine the time intervals (as described above in FIG. 3). The channel analysis unit 108 can further utilize the transmission schedule of the network devices in the neighbor PLC network 103 to estimate interference caused on the PLC medium 111 due to transmission of acknowledgements in the neighbor PLC network 103. For example, a transmission from the network device 102 to the network device 104 would typically be followed by an acknowledgement transmission from the network device 104 to the network device 102. The channel analysis unit 108 may take into account the expected transmissions of such acknowledgements which may lead to additional interference on the PLC medium 111. The channel analysis unit 108 can determine the time intervals in the beacon period 300 for which difference in interference is above a predefined threshold. The channel analysis unit 108 may send the information about the time intervals to the channel adaptation unit 109 which may separately perform channel adaptation over the time intervals during transmissions from the network device 106. The flow continues to block 404.

At block 404, channel adaptation parameters are determined for each of the plurality of the time intervals in the beacon period. In one implementation, the channel adaptation unit 109 may determine the channel adaptation parameters for each of the time intervals received from the channel analysis unit 108. For example, in HomePlug AV based systems, the channel adaptation unit 109 may determine a unique tonemap to be utilized for each of the time intervals. In one implementation, a HomePlug AV tonemap may include channel adaptation parameters that can be used for transmission during one or more time interval in the beacon period. The channel adaptation unit 109 may determine the tonemap based on the noise, neighbor interference, and other existing channel conditions (e.g., signal to interference ratio, etc.) of the PLC medium 111 that were determined for each of the time intervals. The channel adaptation parameters may include modulation parameters associated with the tonemaps (e.g., select OFDM carriers, number of bits per OFDM carrier, guard interval between OFDM symbols, etc.), FEC code rate, among others. The channel adaptation unit 109 can determine the channel adaptation parameters separately for each of the time intervals. For example, the channel adaptation unit 109 may determine to increase the FEC code rate for the time intervals 304, 310, 316, and 322 which may have greater amount of interference from the neighbor PLC network 103 as compared to other time intervals. On determining the channel adaptation parameters for each of the time intervals, the channel adaptation unit may store the channel adaptation parameters for the respective time intervals (such as the tonemap configurations for the respective time intervals) in the network device 106. The flow continues to block 406.

At block 406, the channel adaptation parameters are applied to one or more of the plurality of time intervals in the beacon period. In one implementation, the channel adaptation unit 109 applies the channel adaptation parameters to one or more of the plurality time intervals in the beacon period 300 when transmitting data using a transmitter of the network device 106 during the one or more of the plurality of time intervals. For example, the channel adaptation unit 109 may determine that a transmission is scheduled from the network device 106 to the network device 110 during the time interval 304. The channel adaptation unit 109 can determine the channel adaptation parameters for the time interval 304 by reading the channel adaptation parameters (such as the tonemap configurations) stored in the network device 106. For example, the channel adaptation unit 109 may determine that FEC code rate is to be increased and a particular tonemap setting should be used for transmissions during the time interval 304. The channel adaptation unit 109 may modify settings in one or more signal processing units of the transmitter of the network device 106 to increase the FEC code rate. The increased FEC code rate may allow the network device 110 to decode the transmission from the network device 106 and correct errors induced due to interference from the neighbor PLC network 103. The channel adaptation unit 109 may also determine to utilize a particular tonemap configuration for the time interval 304 to modify the number of bits allocated to different OFDM carriers for transmissions during the time interval 304. Thus, the channel adaptation performed by the channel adaptation unit 109 can compensate for the interference due to transmissions from the network devices of the neighbor PLC network 103 on the PLC medium 111.

Figure 5:
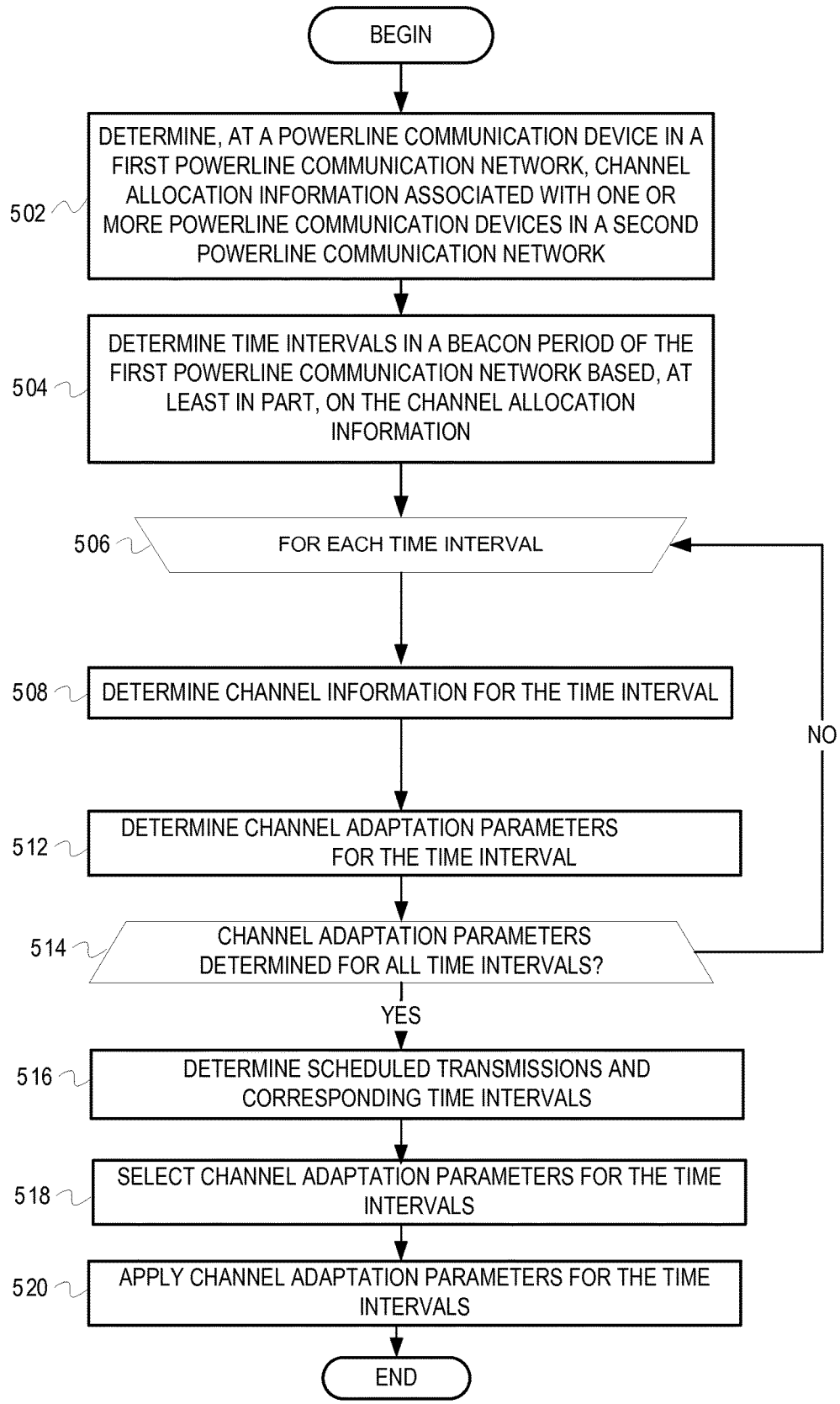
FIG. 5 illustrates a flow diagram of example operations to determine time intervals in a beacon period of a first PLC network based on channel allocation in a second PLC network and to perform channel adaptation based on transmissions in the respective time intervals.

FIG. 5 illustrates a flow diagram of example operations to determine time intervals in a beacon period of a first PLC network based on channel allocation in a second PLC network and perform channel adaptation based on transmissions in the respective time intervals.

At block 502, at a PLC device in a first PLC network, channel allocation information associated with one or more PLC devices in a second PLC network is determined. In one implementation, the channel analysis unit 108 in the network device 106 determines the channel allocation information associated with the network devices 102 and 104 in the neighbor PLC network 103 (as described above with reference to FIG. 4). For example, the channel analysis unit 108 receives the channel allocation information from a central coordinator of the neighbor PLC network 103. The channel allocation information may include information about scheduled transmissions on the PLC medium 111 from the network devices of the neighbor PLC network 103. The flow continues to block 504.

At block 504, time intervals are determined in a beacon period of the first PLC network based, at least in part, on the channel allocation information. In one implementation, the channel analysis unit 108 determines the time intervals in the beacon period 300 of the PLC network 112. For example, the channel analysis unit 108 can determine the time intervals in the beacon period 300 such that the difference in interference (due to transmissions on the PLC medium 111 from the network devices of the neighbor PLC network 103) in the time intervals is above a predefined threshold. The channel analysis unit 108 can send the information about the time intervals to the channel adaptation unit 109, and the channel adaptation unit 109 can determine channel adaptation parameters for each of the time intervals. The flow continues to block 506.

At block 506, a loop is started for each of the time intervals. In one implementation, the channel adaptation unit 109 starts the loop for each of the time intervals in the beacon period 300. The loop includes the operations at blocks 508, 510, 512, and 514. The flow continues to block 508.

At block 508, channel information is determined for the time interval. In one implementation, the channel adaptation unit 109 determines the channel information of the PLC medium 111 for the time interval in the current iteration of the loop. For example, the channel adaptation unit 109 can determine the instantaneous channel state information of the PLC medium 111 (e.g., noise, interference from the neighbor networks, etc.) for the time interval in the current iteration of the loop. The flow continues to block 512.

At block 512, channel adaptation parameters are determined for the time interval. In one implementation, the channel adaptation unit 109 determines the channel adaptation parameters for the time interval in the current iteration of the loop. For example, the channel adaptation unit 109 can determine the modulation parameters associated with a tonemap (e.g., bits per OFDM carrier, guard interval between the OFDM symbols, etc.) and FEC code rate. The channel adaptation unit 109 may determine the number of redundant bits to be utilized in the FEC code to compensate for interference from the neighbor PLC network 103 for transmissions during the time interval (i.e., the time interval in the current iteration of the loop). The channel adaptation unit 109 may store the channel adaptation parameters for the time interval at a memory location in the network device 106. The flow continues to block 514.

At block 514, it is determined whether channel adaptation parameters have been determined for all time intervals. In one implementation, the channel adaptation unit 109 determines whether the channel adaptation parameters have been determined for all the time intervals in the beacon period 300 (i.e., the time intervals for which information was received from the channel analysis unit at block 504). If the channel adaptation parameters have been determined for all the time intervals, control flows to block 516. If the channel adaptation parameters have not been determined for all the time intervals, control loops back to block 506 and the next iteration of loop is performed.

At block 516, scheduled transmissions and their corresponding time intervals are determined. In one implementation, the channel adaptation unit 109 determines the transmissions scheduled at the network device 106. For example, the channel adaptation unit 109 determines the time intervals in a beacon period of the PLC network 112 for which the network device 106 is scheduled to transmit on the PLC medium 111. The flow continues to block 518.

At block 518, channel adaptation parameters are selected for the time intervals. In one implementation, the channel adaptation unit 109 determines the channel adaptation parameters for the time intervals determined at block 516. For example, the channel adaptation unit 109 may read the channel adaptation parameters stored at the memory locations corresponding to the respective time intervals in the network device 106. The flow continues to block 520.

At block 520, channel adaptation parameters are applied for the time intervals. In one implementation, the channel adaptation unit 109 applies the channel adaptation parameters to one more of the time intervals. For example, the channel adaptation unit 109 may apply the channel adaptation parameters corresponding to a time interval during transmission from a transmitter of the network device 106 in the respective time interval. Similarly, the channel adaptation unit 109 may apply the channel adaptation parameters corresponding to other time intervals during transmissions in the respective time intervals.

It is noted that the channel analysis unit 108 is not limited to determining the time intervals of the beacon period 300 based on the channel noise and channel allocation information of the neighbor PLC network 103. In some embodiments, the channel analysis unit 108 may divide the beacon period 300 into the shortest time intervals for which the channel adaptation unit 109 is capable of performing channel adaptation. In other embodiments, the channel analysis unit may utilize a combination of both techniques (i.e., determining the time intervals based on channel allocation information in the neighbor PLC network 103 and dividing the beacon period into the shortest time intervals for which the channel adaptation unit 109 can perform channel adaptation) to determine the time intervals in the beacon period 300.

It is further noted that the channel analysis unit 108 can monitor the PLC medium 111 and dynamically determine the time intervals in the beacon period 300 based on changing network traffic patterns in the neighbor PLC network 103. For example, the TDMA allocations for the network devices in the neighbor PLC network 103 may change when a high priority communication occurs between network devices in the neighbor PLC network 103. In one example, the high priority communication may be a video stream transmission from the network device 102 to the network device 104. The central coordinator of the neighbor PLC network 103 may allocate more timeslots in the beacon period to the network device 102 for transmission. The channel analysis unit 108 may monitor such changes in transmissions on the PLC medium 111 and accordingly determine the time intervals for performing channel adaptation in the beacon period 300.

Similarly, network traffic patterns in the neighbor PLC network 103 may vary when the neighbor PLC network 103 utilizes CSMA channel access scheme. CSMA channel access scheme may allocate the PLC medium 111 to multiple network devices at the same time and the network devices in the neighbor PLC network 103 may contend for channel access. It is noted that the channel analysis unit 108 is capable of monitoring such changes in the network traffic patterns of the neighbor PLC network 103 and can accordingly determine the time intervals in the beacon period 300 for which the channel adaptation can be separately performed.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
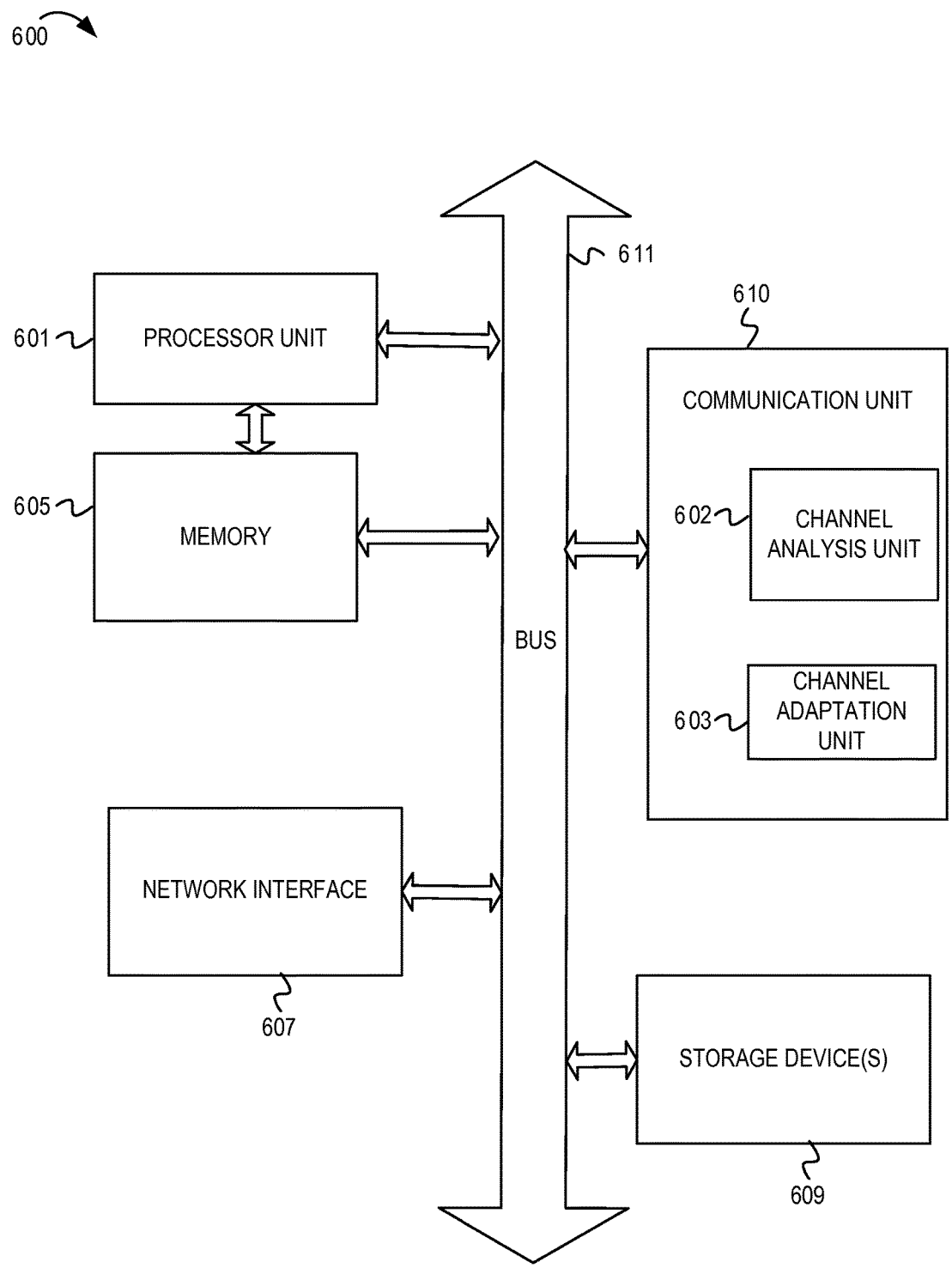
FIG. 6 depicts a block diagram of an example network device.

FIG. 6 depicts a block diagram of an example network device 600. In some implementations, the network device 600 may be a PLC device (e.g., a server, a television, a laptop, etc.). The network device 600 includes a processor unit 601 (possibly including multiple processors, multiple cores, multiple nodes, and/or implementing multi-threading, etc.). The network device 600 includes memory 605. The memory 605 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or one or more of the above already described possible realizations of machine-readable media. The network device 600 also includes a bus 611 (e.g., PCI, PCI-Express, AHB™ AXI™, NoC, etc.), a communication unit 610, and a storage device(s) 609 (e.g., optical storage, magnetic storage, network attached storage, etc.), and a network interface 607 (e.g., a powerline interface, an Ethernet interface, a Frame Relay interface, SONET interface, wireless interface, etc.). The communication unit 610 includes a channel analysis unit 602 and a channel adaptation unit 603. The channel analysis unit 602 may include one or more hardware, firmware, and software components to analyze channel characteristics, and interact with network devices in one or more neighbor communication networks to determine channel allocation information in the neighbor communication networks. The channel analysis unit 602 can utilize the channel characteristics and channel allocation information in neighbor communication networks to determine time intervals in a beacon period of the communication network (i.e., the communication network with which the network device 106 is associated) for which channel adaptation can be separately performed. The channel adaptation unit 109 may include one or more hardware, firmware, and software components to perform channel adaptation in the time intervals of the beacon period to compensate for interference from neighbor communication networks, as described above with reference to FIGS. 1-5. The communication unit 610 may be partially (or entirely) implemented in one or more integrated circuits (e.g., one or more application specific integrated circuits). One or more of these functionalities may be partially (or entirely) implemented in hardware or an application specific integrated circuit. Further, realizations may include fewer or additional components not illustrated in FIG. 6 (e.g., video cards, audio cards, additional network interfaces, peripheral devices, etc.). The processor unit 601, the storage device(s) 609, the network interface 607, and the communication unit 610 are coupled to the bus 611. Although illustrated as being coupled to the bus 611, the memory 605 may be coupled to the processor unit 601.

While the embodiments are described with reference to various implementations and exploitations, it will be understood that these embodiments are illustrative and that the scope of the inventive subject matter is not limited to them. In general, techniques for performing channel adaptation to compensate for interference from a neighbor PLC network in PLC networks, as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for channel adaptation to compensate for interference from powerline communication (PLC) networks, the method comprising:
dividing, at a PLC device of a first PLC network, a beacon period of the first PLC network into a first plurality of time intervals based, at least in part, on variations in interference levels from transmissions of a second PLC network which shares a PLC medium with the first PLC network, wherein the first plurality of time intervals are separate time intervals that indicate when the interference levels change during the beacon period; and
determining channel adaptation parameters for the first plurality of time intervals to compensate for the variations in the interference levels.

2. The method of claim 1, further comprising applying the channel adaptation parameters when transmitting data via the PLC medium during the first plurality of time intervals.

3. The method of claim 1, further comprising:
determining to transmit data via the PLC medium during a first time interval of the first plurality of time intervals; and
applying a first channel adaptation parameter of the channel adaptation parameters associated with the first time interval when transmitting data during the first time interval, wherein
the first time interval comprises two or more transmission opportunities for transmitting data.

4. The method of claim 1, further comprising:
determining a second plurality of time intervals allocated to at least one PLC device in the second PLC network, wherein
the first plurality of time intervals is further based on the second plurality of time intervals.

5. The method of claim 4, wherein said determining the second plurality of time intervals comprises determining the second plurality of time intervals based, at least in part, on a time division multiple access (TDMA) channel access scheme.

6. The method of claim 4, wherein said determining the second plurality of time intervals comprises determining the second plurality of time intervals based, at least in part, on a time offset between the beacon period of the first PLC network and a beacon period of the second PLC network.

7. The method of claim 4, wherein said determining the second plurality of time intervals comprises:
receiving channel allocation information from the at least one PLC device, the channel allocation information indicating the second plurality of time intervals; and
determining the second plurality of time intervals based, at least in part, on the channel allocation information.

8. The method of claim 7, wherein the channel allocation information comprises channel access information associated with a TDMA channel access scheme implemented by the second PLC network.

9. The method of claim 4, wherein said determining the second plurality of time intervals comprises determining bi-directional communication between a first PLC device of the at least one PLC device and a second PLC device of the at least one PLC device.

10. The method of claim 1, wherein
the first plurality of time intervals comprises a first time interval and a second time interval, and
the channel adaptation parameters comprise a first channel adaptation parameter for the first time interval and a second adaptation parameter for the second time interval.

11. The method of claim 1, wherein the variations in the interference levels comprise a difference in the interference levels greater than a threshold.

12. The method of claim 1, wherein the channel adaptation parameters comprise at least one member selected from the group consisting of a number of bits per orthogonal frequency division multiplexing (OFDM) carrier, a guard interval between OFDM symbols, and a number of redundant bits used for forward error correction (FEC).

13. The method of claim 1, wherein
the first plurality of time intervals is further based on existing channel conditions of the PLC medium and the variations in the interference levels.

14. The method of claim 1, wherein said determining the channel adaptation parameters comprises determining a tonemap configuration for each of the first plurality of time intervals.

15. The method of claim 1, further comprising:
after said determining the channel adaptation parameters, monitoring channel allocation information in the second PLC network to determine variations in the channel allocation information; and
adjusting the first plurality of time intervals based on the variations in the channel allocation information.

16. The method of claim 15, wherein the channel allocation information is based, at least in part, on a time division multiple access (TDMA) scheme.

17. The method of claim 15, wherein the channel allocation information is based, at least in part, on a carrier sense multiple access (CSMA) scheme.

18. The method of claim 1, further comprising:
receiving channel allocation information from a central coordinator of the second PLC network, wherein
said dividing the beacon period is further based on the channel allocation information.

19. The method of claim 18, wherein
the PLC device is a central coordinator of the first PLC network, and
said receiving the channel allocation information from the central coordinator of the second PLC network comprises the central coordinator of the first PLC network receiving the channel allocation information from the central coordinator of the second PLC network.

20. The method of claim 1,
wherein the beacon period of the first PLC network has a time offset from a beacon period of the second PLC network.

21. A powerline communication (PLC) device comprising:
a network interface;
a channel analysis unit configured to:
divide a beacon period of a first PLC network into a first plurality of time intervals based, at least in part, on variations in interference levels from transmissions of a second PLC network which shares a PLC medium with the first PLC network, wherein the first plurality of time intervals are separate time intervals that indicate when the interference levels change during the beacon period; and
a channel adaptation unit configured to:
determine channel adaptation parameters for the first plurality of time intervals to compensate for the variations in the interference levels.

22. The PLC device of claim 21, wherein the channel adaptation unit is further configured to apply the channel adaptation parameters when transmitting data via the PLC medium during the first plurality of time intervals.

23. The PLC device of claim 21, wherein the channel adaptation unit is further configured to:
apply a first channel adaptation parameter of the channel adaptation parameters during a first time interval of the first plurality of time intervals for data transmission, wherein
the first time interval comprises two or more transmission opportunities for transmitting data.

24. The PLC device of claim 21, wherein the channel analysis unit is further configured to:
determine a second plurality of time intervals allocated to at least one PLC device in the second PLC network, wherein
the first plurality of time intervals is further based on the second plurality of time intervals.

25. The PLC device of claim 24, wherein the channel analysis unit configured to determine the second plurality of time intervals comprises the channel analysis unit configured to determine the second plurality of time intervals based, at least in part, on a time division multiple access (TDMA) channel access scheme.

26. The PLC device of claim 24, wherein the channel analysis unit configured to determine the second plurality of time intervals comprises the channel analysis unit configured to determine the second plurality of time intervals based, at least in part, on a time offset between the beacon period of the first PLC network and a beacon period of the second PLC network.

27. The PLC device of claim 24, wherein the channel analysis unit configured to determine the second plurality of time intervals comprises the channel analysis unit configured to:
receive channel allocation information from the at least one PLC device, the channel allocation information indicating the second plurality of time intervals; and
determine the second plurality of time intervals based, at least in part, on the channel allocation information.

28. The PLC device of claim 27, wherein the channel allocation information is based, at least in part, on a TDMA channel access scheme implemented by the second PLC network.

29. The PLC device of claim 24, wherein the channel analysis unit configured to determine the second plurality of time intervals further comprises the channel analysis unit configured to determine bi-directional communication between a first PLC device of the at least one PLC device and a second PLC device of the at least one PLC device.

30. The PLC device of claim 21, wherein
the first plurality of time intervals comprises a first time interval and a second time interval, and
the channel adaptation parameters comprise determining a first channel adaptation parameter for the first time interval and a second channel adaptation parameter for the second time interval.

31. The PLC device of claim 21, wherein the variations in the interference levels comprise a difference in the interference levels greater than a threshold.

32. The PLC device of claim 21, wherein the channel adaptation parameters comprise at least one member selected from the group consisting of a number of bits per orthogonal frequency division multiplexing (OFDM) carrier, a guard interval between OFDM symbols, and a number of redundant bits used for forward error correction (FEC).

33. The PLC device of claim 21, wherein the first plurality of time intervals is further based on existing channel conditions on the PLC medium and the variations in the interference levels.

34. The PLC device of claim 21, wherein the channel adaptation unit configured to determine the channel adaptation parameters comprises the channel adaptation unit configured to determine a tonemap configuration for each of the first plurality of time intervals.

35. The PLC device of claim 21, wherein the channel analysis unit is further configured to:
   after the determination of the channel adaptation parameters,
      monitor channel allocation information in the second PLC network to determine variations in the channel allocation information; and
      adjust the first plurality of time intervals based on the variations in the channel allocation information in the second PLC network.

36. A non-transitory machine-readable storage media having machine executable instructions stored therein, the machine executable instructions comprising instructions to:
   divide, at a powerline communication (PLC) device of a first PLC network, a beacon period of the first PLC network into a first plurality of time intervals based, at least in part, on variations in interference levels from transmissions of a second PLC network which shares a PLC medium with the first PLC network, wherein the first plurality of time intervals are separate time intervals that indicate when the interference levels change during the beacon period; and
   determine channel adaptation parameters for the first plurality of time intervals to compensate for the variations in the interference levels.

37. The non-transitory machine-readable storage media of claim 36, further comprising instructions to apply the channel adaptation parameters when transmitting data via the PLC medium during the first plurality of time intervals.

38. The non-transitory machine-readable storage media of claim 36, further comprising instructions to:
   determine a second plurality of time intervals allocated to at least one PLC device in the second PLC network for the transmissions via the PLC medium, wherein
   the first plurality of time intervals is further based on the second plurality of time intervals.

39. The non-transitory machine-readable storage media of claim 38, wherein the instructions to determine the second plurality of time intervals comprise instructions to:
   receive channel allocation information from the at least one PLC device, the channel allocation information indicating the second plurality of time intervals; and
   determine the second plurality of time intervals based, at least in part, on the channel allocation information.

40. The non-transitory machine-readable storage media of claim 36, wherein the instructions to determine the channel adaptation parameters comprise instructions to determine a tonemap configuration for each of the first plurality of time intervals.

* * * * *